(12) United States Patent
Khasin et al.

(10) Patent No.: US 9,831,499 B2
(45) Date of Patent: Nov. 28, 2017

(54) ZINC ELECTRODE FOR USE IN RECHARGEABLE BATTERIES

(71) Applicant: PHINERGY LTD., Lod (IL)

(72) Inventors: Ernst Khasin, Rehovot (IL); Dekel Tzidon, Hod Hasharon (IL)

(73) Assignee: PHINERGY LTD., Lod (IL)

( * ) Notice: Subject to any disclaimer, the term of this patent is extended or adjusted under 35 U.S.C. 154(b) by 251 days.

(21) Appl. No.: 14/390,662

(22) PCT Filed: Mar. 13, 2013

(86) PCT No.: PCT/IL2013/050234
§ 371 (c)(1),
(2) Date: Oct. 3, 2014

(87) PCT Pub. No.: WO2013/150519
PCT Pub. Date: Oct. 10, 2013

(65) Prior Publication Data
US 2015/0093605 A1 Apr. 2, 2015

Related U.S. Application Data

(60) Provisional application No. 61/619,978, filed on Apr. 4, 2012.

(51) Int. Cl.
*H01M 4/42* (2006.01)
*H01M 10/04* (2006.01)
*H01M 4/38* (2006.01)
*H01M 4/62* (2006.01)
*H01M 4/04* (2006.01)
*H01M 4/24* (2006.01)
*H01M 4/30* (2006.01)
*H01M 4/66* (2006.01)
*H01M 10/24* (2006.01)
*H01M 12/08* (2006.01)
*H01M 4/02* (2006.01)

(52) U.S. Cl.
CPC .......... *H01M 4/42* (2013.01); *H01M 4/0435* (2013.01); *H01M 4/0471* (2013.01); *H01M 4/244* (2013.01); *H01M 4/30* (2013.01); *H01M 4/38* (2013.01); *H01M 4/62* (2013.01); *H01M 4/622* (2013.01); *H01M 4/623* (2013.01); *H01M 4/667* (2013.01); *H01M 10/04* (2013.01); *H01M 10/24* (2013.01); *H01M 12/08* (2013.01); *H01M 2004/021* (2013.01); *Y02E 60/124* (2013.01); *Y02E 60/128* (2013.01)

(58) Field of Classification Search
CPC .. H01M 10/04; H01M 4/0435; H01M 4/0471; H01M 4/244; H01M 4/30; H01M 4/62; H01M 4/623; H01M 4/667; H01M 4/38; H01M 4/42; H01M 4/622; H01M 10/24; H01M 12/08; H01M 2004/021
See application file for complete search history.

(56) References Cited

U.S. PATENT DOCUMENTS

| | | | |
|---|---|---|---|
| 3,384,482 A | 5/1968 | Kelly et al. | |
| 3,706,601 A * | 12/1972 | Strier | H01M 4/26 264/104 |
| 4,135,039 A | 1/1979 | Jenkins | |
| 4,372,823 A | 2/1983 | Church et al. | |
| 4,857,424 A | 8/1989 | Larsen et al. | |
| 5,599,637 A | 2/1997 | Pecherer et al. | |
| 6,582,851 B2 | 6/2003 | Cheiky et al. | |
| 7,537,863 B2 | 5/2009 | Eylem et al. | |
| 8,142,938 B2 | 3/2012 | Khasin et al. | |
| 2003/0215717 A1 | 11/2003 | Miyaki | |
| 2005/0106457 A1* | 5/2005 | Richards | H01M 4/244 429/206 |
| 2006/0257744 A1 | 11/2006 | Burchardt | |
| 2013/0230774 A1* | 9/2013 | Ortega | H01M 4/50 429/221 |

OTHER PUBLICATIONS

Supplementary European Search Report for European Application No. 13772851.5 dated Oct. 20, 2015.
International Search Report for PCT Application No. PCT/IL2013/050234 dated Aug. 16, 2013.

* cited by examiner

*Primary Examiner* — Muhammad Siddiquee
(74) *Attorney, Agent, or Firm* — Pearl Cohen Zedek Latzer Baratz LLP

(57) ABSTRACT

The present invention relates to zinc electrode and to methods of producing zinc electrode and particularly to a method of producing zinc electrode providing dimensional/geometrical stability during a battery charge/discharge operation. The invention provides methods of use of batteries comprising the zinc electrode of this invention. Applications of batteries of this invention include electric vehicles, portable electronics and drones.

19 Claims, 1 Drawing Sheet

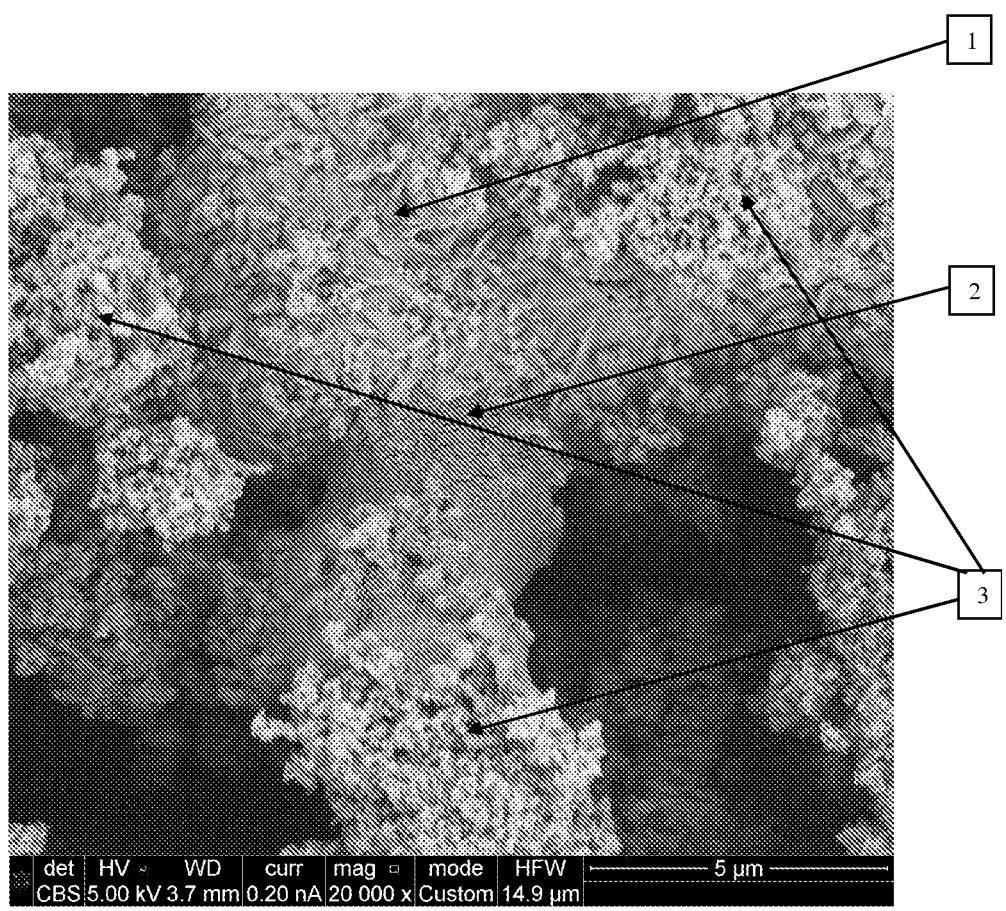

ZINC ELECTRODE FOR USE IN RECHARGEABLE BATTERIES

CROSS-REFERENCE TO RELATED APPLICATIONS

This application is a National Phase Application of PCT International Application No. PCT/IL2013/050234, International Filing Date Mar. 13, 2013, claiming priority of U.S. Provisional Application No. 61/619,978, filed Apr. 4, 2012 which are hereby incorporated by reference.

FIELD OF THE INVENTION

The present invention relates to zinc anodes and to method of producing zinc anodes having dimensional/geometrical stability during a battery charge/discharge operation. Batteries comprising anodes of the invention are suitable for electric vehicles, portable electronics, drones and other applications.

BACKGROUND OF THE INVENTION

Rechargeable zinc electrodes have application in secondary (rechargeable) cells and batteries that incorporate a zinc negative flat electrode (anode). Examples of such rechargeable cells and batteries in which the electrolyte is alkaline (aqueous KOH) are silver-zinc, zinc-air, nickel-zinc and manganese dioxide-zinc and other systems.

The usual practice to produce a zinc anode for zinc-air secondary batteries has been to prepare a paste containing the solid components of the anode and containing the electrolyte. US Patent Application 20060257744 teaches that an anode could be manufactured by mixing the zinc powder, an organic binding agent (which is used for shape stability), gelling agent and other solid components with an electrolyte to form a paste and pressing a current collector into the paste. U.S. Pat. No. 6,582,851 discloses the use of an encapsulation technique for surrounding the zinc/zinc oxide particles with a special material which induces the zinc to re-plate in the same mesh size as it was originally assembled. The paste of this material also contains organic powder material and liquid electrolyte.

Until now poor deep cycle lifetime has been observed in systems with these zinc anodes, typically below 200-300 cycles at depths of discharge (DOD) of above 50%. The zinc electrode is not highly stable on charge/discharge cycling in the alkaline electrolyte and the zinc active mass in the electrode tends to partially dissolve in the electrolyte and redistribute in a non-uniform manner. Another problem with such anodes is that the organic powder binder tends to coagulate as a film on the outside of the electrode. This reduces the effect of the binder in avoiding shape changes.

Two major failure modes have been encountered. In the first failure mode (dendrite failure) the cell shorts out on charge due to the uncontrolled growth of zinc dendrites between the zinc flat electrode and the opposing positive electrode, with the dendrites penetrating the separator between the electrodes. In the second failure mode (shape change failure) the zinc redistributes on cycling to gather on the lower portions of the electrode. This causes increased mechanical stress in the cell stack, a lower electrode active area, and a successively reduced capacity return (capacity fading) on cycling.

SUMMARY OF THE INVENTION

In one embodiment, this invention provides compositions of zinc electrodes, batteries comprising zinc electrodes of this invention and methods of preparation thereof. This invention further provides methods of use of batteries comprising the zinc electrodes of this invention.

In one embodiment, this invention provides a rechargeable zinc electrode, the electrode comprising a current collector and a composition comprising:
 a) a zinc or zinc alloy powder;
 b) optionally zinc oxide or zinc oxide alloyed powder;
 c) a thermoplastic organic binder material; and
 d) optionally a gelling agent;
wherein said electrode is porous.

In one embodiment, the composition further comprises a stabilizing agent.

In one embodiment, the porosity of the electrode is at least 50%.

In one embodiment, this invention provides a rechargeable zinc electrode comprising a current collector and a composition wherein the composition comprises:
 a) between 1.0-99.0 wt % zinc or zinc alloy powder;
 b) optionally between 99.0-1.0 wt % zinc oxide or zinc oxide alloyed powder;
 c) between 0.1-10 wt % thermoplastic organic binder material; and
 d) between 0.01-10 wt % gelling agent;
wherein said wt % is from the total weight of the composition.

In one embodiment, the composition further comprises a stabilizing agent at a wt % ranging between 0.1-20 wt %, wherein the wt % is from the total weight of the composition.

In one embodiment, this invention provides a rechargeable battery comprising at least one anode and at least one cathode, wherein the anode comprises a current collector and a composition comprising:
 a) a zinc powder;
 b) a zinc oxide powder;
 c) thermoplastic organic binder material; and
 d) optionally a gelling agent;
wherein the anode is porous.

In one embodiment, the composition further comprises a stabilizing agent.

In one embodiment, the porosity of the anode in the battery is at least 50%. In one embodiment, the porosity of the anode in the battery is at least 35%. In one embodiment, the porosity of the anode in the battery is at least 20%.

In one embodiment, this invention provides a rechargeable battery comprising at least one anode and at least one cathode, wherein the anode comprising a current collector and a composition comprising:
 a) between 1.0-99.0 wt % zinc or zinc alloy powder;
 b) optionally between 99.0-1.0 wt % zinc oxide or zinc oxide alloyed powder;
 c) between 0.1-10 wt % thermoplastic organic binder material; and
 d) between 0.01-10 wt % gelling agent;
wherein the wt % is from the total weight of said composition.

In one embodiment, the composition further comprises a stabilizing agent at a wt % ranging between 0.1-20 wt %, wherein the wt % is from the total weight of the composition.

In one embodiment, this invention provides a composition for the preparation of a rechargeable zinc electrode, the composition comprising:
 a) a zinc powder or zinc alloy powder;
 b) optionally a zinc oxide or a zinc oxide alloyed powder;
 c) a thermoplastic organic binder material;

d) optionally a pore former material; and
e) optionally a gelling agent.

In one embodiment, the composition comprises a pore former material. In another embodiment, the composition does not comprise a pore former material. In one embodiment, the composition comprises a gelling agent. In another embodiment, the composition does not comprise a gelling agent.

In one embodiment, the composition further comprises a raw material for a metal oxide stabilizing agent. In one embodiment, the composition further comprises a metal hydroxide as a raw material for a metal oxide stabilizing agent. In one embodiment, the composition further comprises a precursor of a stabilizing agent. In one embodiment, the precursor or the raw material is aluminum hydroxide.

In one embodiment, this invention provides a composition for the preparation of a rechargeable zinc electrode, the composition comprising:
   a) between 1.0-99.0 wt % zinc powder or zinc alloy powder;
   b) optionally between 99.0-1.0 wt % zinc oxide powder;
   c) between 0.1-10 wt % thermoplastic organic binder material;
   d) between 0.01-20 wt % pore former material; and
   e) between 0.01-10 wt % gelling agent;
wherein said wt % is from the total weight of said composition.

In one embodiment, the composition further comprises a stabilizing agent at a wt % ranging between 0.1-20 wt %, wherein the wt % is from the total weight of the composition.

In one embodiment, the organic binder material comprises polytetrafluoroethylene (PTFE), fluorinated ethylenepropylene (FEP), perfluoroalkoxy (PFA), or a combination thereof.

In one embodiment, this invention provides a method for producing a zinc electrode, the method comprising:
   a) preparing a homogeneous mixture comprising of zinc or zinc alloy powder, optionally zinc oxide or zinc oxide alloyed powder, a polymer powdered material, optionally a pore former material and optionally a gelling agent
   b) pasting, pressing or rolling the homogeneous mixture on top and/or around a current collector thus forming a dry green compact;
   c) sintering the formed dry green compact at a temperature above the melting point of said polymer powdered material; and
   d) optionally removing said pore former or portions thereof by dissolving the product of step c) in a liquid.

In one embodiment, the homogeneous mixture further comprises a precursor of a stabilizing agent and the sintering step is conducted at a temperature above the precursor/stabilizing agent phase-transition temperature.

In one embodiment, the homogeneous mixture further comprises a metal oxide precursor/stabilizing agent and the sintering step is conducted at a temperature above the metal oxide phase transition temperature.

In one embodiment, the current collector comprises a silver-coated nickel screen. In one embodiment, the sintering temperature ranges between 250° C. and 350° C.

In one embodiment, this invention provides a method of operating a vehicle, said method comprising:
   providing a rechargeable battery comprising at least one anode and at least one cathode, wherein said anode comprising:
      a) a zinc or zinc alloy powder;
      b) optionally a zinc oxide or zinc oxide alloyed powder;
      c) a thermoplastic organic binder material; and
      d) optionally a gelling agent;
      e) wherein said electrode is porous; and
   using said battery to operate a vehicle.

In one embodiment, the composition further comprises a stabilizing agent.

In one embodiment, the vehicle is an electric car. In one embodiment, the battery provides the power needed to run said car.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a SEM image of the anode after sintering; 1: particle of zinc powder; 2: melted PFA; 3: gamma $Al_2O_3$.

It will be appreciated that for simplicity and clarity of illustration, elements shown in the FIGURES have not necessarily been drawn to scale. For example, the dimensions of some of the elements may be exaggerated relative to other elements for clarity. Further, where considered appropriate, reference numerals may be repeated among the FIGURES to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, the present invention provides a method to eliminate or to greatly reduce battery/electrode failure modes. Reducing the failure modes is achieved by substantially immobilizing the zinc active mass in its charged form (zinc) or discharged form (zinc oxide).

In one embodiment, this invention provides a rechargeable zinc electrode, the electrode comprising a current collector and a composition comprising:
   a) a zinc or zinc alloy powder;
   b) optionally zinc oxide or zinc oxide alloyed powder;
   c) a thermoplastic organic binder material; and
   d) optionally a gelling agent;
wherein the electrode is porous.

In one embodiment, the composition further comprises a stabilizing agent.

In one embodiment, the porosity of the electrode is at least 50%. In one embodiment, the porosity of the electrode is at least 20%. In one embodiment, the porosity of the electrode is at least 35%.

In one embodiment, this invention provides a rechargeable zinc electrode, the electrode comprising a current collector and a composition comprising:
   a) between 1.0-99.0 wt % zinc or zinc alloy powder;
   b) optionally between 99.0-1.0 wt % zinc oxide or zinc oxide alloyed powder;

c) between 0.1-10 wt % thermoplastic organic binder material;

d) between 0.01-10 wt % gelling agent;

wherein said wt % is from the total weight of said composition.

In one embodiment, the composition further comprises a stabilizing agent at a wt % ranging between 0.1-20 wt %, wherein the wt % is from the total weight of the composition.

In one embodiment, the zinc electrode of this invention comprises a current collector and a composition wherein the composition comprises zinc or zinc alloy powder. In another embodiment, the concentration of the zinc or zinc alloy powder is between 1.0 to 99.0 wt % of the total composition weight (i.e from the total electrode weight excluding the current collector). In another embodiment, the concentration of the zinc or zinc alloy powder is between 70 to 80 wt % of the total composition weight. In another embodiment, the concentration of the zinc or zinc alloy powder is between 50 to 90 wt % of the total composition weight. In another embodiment, the concentration of the zinc or zinc alloy powder is between 80 to 99 wt % from the total composition weight. In another embodiment, the concentration of the zinc or zinc alloy powder is between 10 to 60 wt % of the total composition weight. In another embodiment, the concentration of the zinc or zinc alloy powder is between 65 to 85 wt % of the total composition weight. In another embodiment, the concentration of the zinc or zinc alloy powder is between 90 to 99 wt % of the total composition weight. In another embodiment, the concentration of the zinc or zinc alloy powder is between 1.0 to 20 or between 1.0 to 10 wt % of the total composition weight.

In one embodiment, the zinc electrode of this invention comprises a current collector and a composition wherein the composition comprises zinc oxide or zinc oxide alloyed powder. In another embodiment, the concentration of the zinc oxide or zinc oxide alloyed powder is between 99.0-1.0 wt % of the total composition weight. In another embodiment, the concentration of the zinc oxide or zinc oxide alloyed powder is between 1 wt % and 10 wt % or between 10-20 wt % of the total composition weight. In another embodiment, the concentration of the zinc oxide or zinc oxide alloyed powder is between 5-35 wt % of the total composition weight. In another embodiment, the concentration of the zinc oxide or zinc oxide alloyed powder is between 50-80 wt % the total composition weight. In another embodiment, the concentration of the zinc oxide or zinc oxide alloyed powder is between 75-99 wt % of the total composition weight. In another embodiment, the concentration of the zinc oxide or zinc oxide alloyed powder is between 25-50 wt % of the total composition weight.

In one embodiment, the zinc electrode of this invention comprises a current collector and a composition wherein the composition comprises zinc or zinc alloy powder and zinc oxide or zinc oxide alloyed powder. In another embodiment, the concentration of the zinc or zinc alloy powder is between 50-90 wt % of total composition weight and the concentration of the zinc oxide or zinc oxide alloyed powder is between 10-50 wt % of total composition weight. In another embodiment, the concentration of the zinc or zinc alloy powder is between 80-90 wt % of total composition weight and the concentration of the zinc oxide or zinc oxide alloy powder is between 10-20 wt % of total composition weight. In another embodiment, the concentration of the zinc or zinc alloy powder is between 60-99 wt % of the total composition weight and the concentration of the zinc oxide or zinc oxide alloy powder is between 1-40 wt % of total composition weight. In another embodiment, the concentration of the zinc or zinc alloy powder is between 1-50 wt % of the total composition weight and the concentration of the zinc oxide or zinc oxide alloy powder is between 50-99 wt % of total composition weight.

In one embodiment, the zinc electrode of this invention comprises a current collector and a composition, wherein the composition comprises zinc or zinc alloy powder, zinc oxide or zinc oxide alloy powder, a binder and optionally a gelling agent. In one embodiment, the composition further comprises a stabilizing agent. In one embodiment, the composition comprises between 70-80 wt % of zinc or zinc alloy powder out of the total composition weight, between 15-20 wt % of zinc oxide or zinc oxide alloy of the total composition weight, between 3-6 wt % of binder of the total composition weight and between 1-4 wt % of gelling agent of the total composition weight. In one embodiment, the composition further comprises between 0.1-20% of stabilizing agent (wt % of the total composition weight).

In one embodiment, the composition further comprises between 1-10 wt % of a stabilizing agent or of a precursor of a stabilizing agent. In one embodiment, the composition further comprises between 0.1-10 wt % of stabilizing agent or of a precursor of a stabilizing agent. In one embodiment, the composition further comprises between 10-20 wt % of a stabilizing agent or of a precursor of a stabilizing agent. In one embodiment, the wt % is from the total composition weight.

In one embodiment, the composition does not comprise zinc oxide. In one embodiment, the composition comprises zinc oxide. In one embodiment, including zinc oxide in the composition provides a better electrode structure. In one embodiment, including zinc oxide in the composition for electrode preparation enhances electrode performance.

In one embodiment, the zinc powder comprises a zinc alloy. In one embodiment, the zinc alloy comprises indium, bismuth or a combination thereof. In one embodiment, the zinc alloy comprises 200-300 ppm indium and 200-300 ppm bismuth. In one embodiment the zinc oxide powder comprises 200-300 ppm indium and 200-300 ppm bismuth. In one embodiment, the term "zinc oxide alloyed powder" refers to the oxide of a zinc alloy. In one embodiment, the term "zinc oxide alloyed powder" refers to the oxide of a zinc alloy wherein the zinc alloy comprises small amounts of Bi and In.

In one embodiment, the zinc electrode of this invention comprises a polymer powdered material. In another embodiment, the polymer powdered material is an organic binder material. In another embodiment, the polymer powdered material is a polymer binder. In another embodiment, the binder is a fluoropolymer such as polytetrafluoroethylene (PTFE), perfluoroalkoxy (PFA), fluorinatedethylenepropylene (FEP) and other polymers which melt at around 260-330° C. In one embodiment, the binder is loaded at 0.1-10% of the total zinc amount (wt %) (if no zinc oxide is initially present). In one embodiment, the binder is loaded at 1-10% of the total zinc amount (wt %) (if no zinc oxide is initially present). In one embodiment, the binder is loaded at 0.1-10 wt % of the total zinc plus zinc oxide amount (if zinc oxide is initially present). In one embodiment, the binder is loaded at 1-10 wt % of the total zinc plus zinc oxide amount (if zinc oxide is initially present). In one embodiment, the binder is loaded at 1-10% of the total electrode preparation composition (wt %). In one embodiment, the binder is loaded at 0.1-10% of the total electrode preparation composition (wt %). The percentage of the binder is chosen such that it will not adversely impact electrode conductivity and wetting ability.

In one embodiment, the zinc electrode of this invention comprises a gelling agent. In one embodiment, the gelling agent (or gel precursor) comprises between 0.01-10 wt % of the total weight of the zinc/zinc oxide. In one embodiment, the gelling agent comprises between 1-2 wt % of the total weight of the zinc/zinc oxide. In one embodiment, the gelling agent comprises between 0.01-10 wt % of the total weight of the electrode composition. In one embodiment, the gelling agent comprises between 1-2 wt % of the total weight of the electrode composition. In one embodiment, the gelling agent forms in-situ an immobilizing gel with the alkaline electrolyte (typically aqueous KOH) used in the battery and this gelling agent precursor must be thermally stable at the anode sintering temperature (typically around 320° C. for PFA binders). In one embodiment, suitable gelling agents are inorganic, for example minerals such as sepiolite, attapulgite, perlite, or vermiculite. In one embodiment, suitable gelling agents are organic. Conventional organic gelling agents for KOH include for example carbopol, carboxymethylcellulose and polyvinyl alcohol which lack adequate thermal stability for some compositions. However, when lower sintering temperatures are used (depending on the organic binder melting point), organic gelling agents as described above can be used. For example, if the sintering temperature is 120° C., polyvinyl alcohol can be used as the gelling agent. In contrast to other zinc electrode preparation compositions, no liquid electrolyte liquid electrolyte is present in the pre-sintered green anode of this invention.

In one embodiment, the gel precursor refers to a gelling agent. In one embodiment, the gelling agent absorbs or dissolves the electrolyte when the electrode is soaked in the electrolyte. In one embodiment, the gelling agent absorbs or dissolves the electrolyte when the electrode is used in a battery.

In one embodiment, the electrode composition further comprises other components. In one embodiment, the composition further comprises conductive ceramics, graphite particles or graphite fibers and/or other electrically-conductive materials such as carbon nanotubes. In one embodiment, conductive additives aid in forming an adequate structure. In one embodiment, the conductive additives are conductive but do not participate in the electrochemical electrode reaction. In one embodiment, the conductive additives are inert with respect to the electrochemical reaction, but helps to carry out the reaction thanks to the conductivity and the structural characteristics that the additives gives the electrode. Other additives and structural components may be added to the electrode-forming composition in one embodiment.

In one embodiment, the electrode composition further comprises a stabilizing agent in form of powdered solid material having fine porous structure. In one embodiment, the stabilizing agent absorbs the electrolyte when electrode is soaked in the electrolyte or used in a battery. In one embodiment the stabilizing agent provides better stability of zinc active mass by preventing its redistribution into the zinc electrode on charge/discharge cycling. An example of such a stabilizing agent is alumina or its thermally decomposed precursor aluminum hydroxide.

In one embodiment, the zinc electrode of this invention comprises a current collector. In one embodiment, the current collector comprises silver coated Ni. In one embodiment, the current collector comprises copper or brass. In one embodiment, the current collector comprises zinc. In one embodiment, the current collector comprises Ni mesh coated by indium or bismuth. In one embodiment, the current collector comprises Ni foam. In one embodiment, the current collector comprises Ni foam coated by indium or bismuth.

In one embodiment, the zinc electrode of this invention is porous. In one embodiment, the porosity of the electrode ranges between 40% and 60%. In one embodiment, the porosity of the electrode ranges between 20% and 80%. In one embodiment, the porosity of the electrode ranges between 50% and 90%. In one embodiment, the porosity of the electrode ranges between 30% and 70%. In one embodiment, the porosity of the electrode is about 50%. In one embodiment, the porosity of the electrode is at least 35%. In one embodiment, the porosity of the electrode is at least 20%. In one embodiment, the porosity of the electrode is at least 50%. In one embodiment, the percent porosity of the electrode is measured by comparing the weight of the dry electrode to the weight of the same electrode when filled with a liquid. In one embodiment, the liquid that is used to fill the electrode for porosity measurement is an alcohol. In one embodiment, the alcohol is isopropanol.

In one embodiment, the electrode functions as an anode in a discharge mode. In one embodiment, the electrode is used as a zinc anode in a metal air battery. In one embodiment, the zinc electrode dimensions including the current collector are about 5 cm×5 cm for length and width respectively. In one embodiment, the thickness of the electrode is about 2 mm. In one embodiment, the thickness of the electrode is about 3 mm. In one embodiment, the thickness of the electrode ranges between 0.5 mm and 5 mm.

In one embodiment, the zinc electrode is flat. In one embodiment, the zinc electrode is in the form of a plate. In one embodiment, the zinc electrode is rounded. In one embodiment, the zinc electrode can be molded to any desired shape or geometry.

In one embodiment, this invention provides a composition for the preparation of a rechargeable zinc electrode, said composition comprising:
  a) a zinc powder or zinc alloy powder;
  b) optionally a zinc oxide or a zinc oxide alloyed powder;
  c) a thermoplastic organic binder material;
  d) optionally a pore former material; and
  e) optionally a gelling agent;
In one embodiment, the composition further comprises a stabilizing agent.

In one embodiment this invention provides a composition for the preparation of a rechargeable zinc electrode, said composition comprising:
  a) between 1.0-99.0 wt % zinc powder or zinc alloy powder;
  b) optionally between 99.0-1.0 wt % zinc oxide powder;
  c) between 0.1-10 wt % thermoplastic organic binder material;
  d) between 0.01-20 wt % pore former material; and
  e) between 0.01-10 wt % gelling agent;
wherein said wt % is from the total weight of said composition.

In one embodiment, the composition further comprises a stabilizing agent at a wt % ranging between 0.1-20 wt %, wherein the wt % is from the total weight of the composition.

In one embodiment, the thermoplastic organic binder material in the electrode preparation composition and in the resulting electrode comprises a polymer. In one embodiment, the organic binder material comprises a fluoropolymer. In one embodiment, the fluoropolymer comprises polytetrafluoroethylene (PTFE), fluorinated ethylenepropylene (FEP), perfluoroalkoxy (PFA), or a combination thereof.

In one embodiment, the pore former comprises a heat fugitive. In one embodiment, the heat fugitive comprises ammonium bicarbonate or camphor. In one embodiment, the pore former comprises a water soluble pore former material. In one embodiment, the water soluble pore former comprises an organic compound (e.g. urea) or an inorganic compound e.g. a common salt (NaCl) or sodium sulfate. In one embodiment, the pore former is removed during or following sintering. In one embodiment, the pore former confers an adequate porosity to the electrode. In one embodiment, the pore former yields an electrode with porosity of at least 50% or in another embodiment a porosity of at least 20% or in another embodiment a porosity of at least 35%.

In one embodiment, this invention provides a rechargeable battery comprising at least one anode and at least one cathode, wherein said anode comprising a current collector and a composition comprising:
 a) a zinc powder;
 b) a zinc oxide powder;
 c) thermoplastic organic binder material; and
 d) optionally a gelling agent;
wherein the anode is porous.

In one embodiment, the composition further comprises a stabilizing agent.

In one embodiment, the porosity of said anode in said battery is at least 50%. In one embodiment, the porosity of said anode in said battery is at least 35%. In one embodiment, the porosity of said anode in said battery is at least 20%.

In one embodiment, this invention provides a rechargeable battery comprising at least one anode and at least one cathode, wherein said anode comprising a current collector and a composition comprising:
 a) between 1.0-99.0 wt % zinc or zinc alloy powder;
 b) optionally between 99.0-1.0 wt % zinc oxide or zinc oxide alloyed powder;
 c) between 1-10 wt % thermoplastic organic binder material; and
 d) between 0.01-10 wt % gelling agent;
wherein said wt % is from the total weight of said composition.

In one embodiment, the composition further comprises a stabilizing agent at a wt % ranging between 0.1-20 wt %, wherein the wt % is from the total weight of the composition.

In one embodiment, the battery is a metal air battery. In one embodiment, the cathode of said battery comprises carbonless air cathode catalyzed by silver nanoporous catalyst as described in U.S. Pat. No. 8,142,938 fully incorporated herein by reference.

In one embodiment, the battery utilizes an electrolyte. In one embodiment, the electrolyte is KOH. In one embodiment, the electrolyte comprises 25-50% aqueous KOH. In one embodiment, the KOH is 30 wt % aqueous KOH. In one embodiment, the KOH is 30 wt % in water solution.

In one embodiment the solvent of the KOH solution is water. In one embodiment, the zinc anode is prepared as described above without any KOH initially present in the electrode composition. Once the zinc anode is prepared (e.g. after the sintering process), the electrode is soaked in KOH aqueous solution in one embodiment, and the KOH aqueous solution penetrates the zinc anode. The electrode becomes (at least partially) soaked in KOH and is ready for further processing.

In one embodiment, this invention provides a method for producing a zinc electrode, the method comprising:
 a) preparing a homogeneous mixture comprising of zinc or zinc alloy powder, zinc oxide or zinc oxide alloyed powder, a polymer powdered material, optionally a pore former material, and optionally a gelling agent;
 b) pasting, pressing or rolling the homogeneous mixture on top and/or around a current collector thus forming a dry green compact;
 c) sintering the formed dry green compact at a temperature above the melting point of said polymer powdered material;
 d) optionally removing said pore former or portions thereof by dissolving in a liquid.

In one embodiment, the homogeneous mixture further comprises a precursor of a stabilizing agent and the sintering step is conducted at a temperature above the precursor/stabilizing agent phase-transition temperature.

In one embodiment, the method described herein above is used for producing a rechargeable zinc electrode, the electrode comprising a current collector and a composition comprising:
 a) a zinc or zinc alloy powder;
 b) optionally zinc oxide or zinc oxide alloyed powder;
 c) a thermoplastic organic binder material; and
 d) optionally a gelling agent;
 e) optionally a stabilizing agent or a precursor thereof;
wherein said electrode is porous.

In one embodiment, a rechargeable zinc electrode, comprising a current collector and a composition comprising:
 a. a zinc or zinc alloy powder;
 b. optionally zinc oxide or zinc oxide alloyed powder;
 c. a thermoplastic organic binder material; and
 d. optionally a gelling agent;
 e. optionally a stabilizing agent or a precursor thereof;
wherein said electrode is porous,
is produced by methods of this invention.

In one embodiment, a rechargeable zinc electrode comprising a current collector and a composition comprising:
 a. a zinc or zinc alloy powder;
 b. optionally zinc oxide or zinc oxide alloyed powder;
 c. a thermoplastic organic binder material; and
 d. optionally a gelling agent;
 e. optionally a stabilizing agent or a precursor thereof;
is produced using methods of the invention that comprise a sintering step as described herein above.

In one embodiment, a method of preparation of the anodes of this invention comprises three main steps:
A. first, the active zinc (and/or zinc oxide) powdered material is mixed with a polymer powdered material, optionally a pore former material, optionally a precursor of a stabilizing agent and optionally a gelling agent;
B. the mixture of step A, is shaped (molded, formed) by pasting, rolling or pressing;
C. the shaped mixture of step B undergoes a heat treatment operation (sintering) at a temperature above the so called melting point of the polymer material and optionally above the phase transition temperature of the precursor of a stabilizing agent.

In one embodiment, the pre-sintered (green) anode (Step B) is prepared containing a heat fugitive pore former material or water-soluble pore former material that is removable during or following sintering. The pore former material confers an adequate porosity to the electrode (at least 50% porosity is desirable). Preferred heat fugitive pore formers are for example ammonium bicarbonate or camphor. Preferred water soluble pore formers are for example common salt (NaCl), urea (carbamide) or sodium sulfate.

The sintering step of this invention results in the formation of fibrous cage-like polymer structure which provides interparticle binding and also binding onto a current collecting metal mesh, thereby reinforcing mechanically the zinc active mass during charge/discharge operation. In one embodiment, the sintering step further results in $Al(OH)_3 \rightarrow$ gamma $Al_2O_3$ phase transition which provides additional micro porosity to the anode as a result of the $Al(OH)_3$ dehydrating process.

In one embodiment, the current collector comprises a silver-coated nickel screen. In one embodiment, the sintering temperature ranges between 250° C. and 350° C.

In one embodiment, this invention provides a method of operating a vehicle, said method comprising:

providing a rechargeable battery comprising at least one anode and at least one cathode, wherein said anode comprising:
  a) a zinc or zinc alloy powder;
  b) optionally a zinc oxide or zinc oxide alloyed powder;
  c) a thermoplastic organic binder material; and
  d) optionally a gelling agent;
wherein said electrode is porous; and
  using said battery to operate a vehicle.

In one embodiment, the anode further comprises a stabilizing agent.

In one embodiment, the vehicle operated by said battery is an electric car. In one embodiment, the battery provides the power needed to run said car.

In one embodiment, the battery delivers 5 Ah (75% depth of discharge) at about 1.1V average discharge voltage for 20 cycles. In one embodiment, the vehicle operated by the battery is an electric car. In one embodiment, the vehicle is a bike, a motorcycle, an unmanned air vehicle, or a marine vehicle. Applications of batteries of this invention include electric vehicles, portable electronics, energy storage and drones.

In one embodiment, the battery provides the power needed to run an electric car.

Definitions

In one embodiment, the term 'green' is a metallurgical term. In one embodiment, the term 'green' anode refers to the anode after compacting but before sintering. In one embodiment, the term "dry green compact" refers to the product of the pasting, pressing or rolling step of the homogeneous mixture. In one embodiment, the "dry green compact" is the result of pasting, pressing or rolling the homogeneous mixture comprising of: zinc or zinc alloy powder, optionally zinc oxide or zinc oxide alloyed powder, a polymer powdered material, optionally a pore former material, and optionally a gelling agent and optionally a stabilizing agent or a precursor thereof. Unlike the homogeneous mixture which is in a powder form in some embodiments, the dry green compact is a rigid body having a certain dimension.

In one embodiment, the term "polymer powdered material" refers to the thermoplastic organic binder.

The term 'zinc active mass' refers to the components of the electrode. In one embodiment, the term 'zinc active mass' refers to the Zn, optionally the zinc oxide, the organic binder, optionally the stabilizing agent and the gelling agent.

In one embodiment, the term 'zinc active mass' refers to a composition comprising zinc.

In one embodiment, a precursor of a stabilizing agent is a material that forms the stabilizing agent during/after processing (e.g. aluminum hydroxide is the precursor and aluminum oxide is the stabilizing agent). In other embodiments, the precursor itself is termed or considered "a stabilizing agent" even though it may undergo a chemical reaction during processing.

In one embodiment, the term 'battery grade' refers to the trade name of zinc and of zinc oxide powder produced by the Grillo Company in Germany. In one embodiment, Grillo zinc and zinc oxide battery grade powder contains indium (200-300 ppm) and bismuth (200-300 ppm).

In one embodiment, the term 'depth of discharge' (DOD) refers to the percentage of the used capacity from the nominal one. Full charged battery has 0% DOD. Full discharged battery has 100% DOD. The discharge process is usually limited by voltage to avoid full discharge. The less DOD percentage, the more the cycle life. For Zn anode in the secondary silver-zinc batteries the cycle life time at 50% DOD is 3-4 times longer than the cycle lifetime at 100% DOD.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

EXAMPLES

Example 1

Electrode Preparation, Battery Assembly and Use of a Battery

A zinc anode was prepared according to an embodiment of the present invention as follows: onto a tabbed silver-coated nickel screen (80 mesh) of size 5 cm×5 cm, the following composition was pressed under 200 kg/cm² pressure:

Battery-grade zinc powder from Grillo having average particle size of about 40 micron (9.5 g), powdered perfluoroalkoxy PFA having average particle size about 20 micron from DuPont (0.5 g), ammonium bicarbonate pore former from Sigma Aldrich (0.45 g) were provided and mixed. The mixture was well-mixed and the quality of the mixing was verified under an optical microscope at a magnification of up to ×500. The well-mixed composition was pressed onto a silver-coated nickel screen in such a manner that the current collector was located in the middle of the compact. The pressed electrode was put between two brass plates with thickness of about 3 mm each and put in a furnace for sintering. The electrode was sintered in air at 320° C. for 20 minutes in order to convert the PFA binder into a fibrous bonding form, and to convert aluminum hydroxide into gamma aluminum oxide and to remove the pore former. SEM image (FIG. 1) shows the structure of the anode after sintering.

The flat electrode after sintering was robust, with a thickness of about 1.8 mm, and porosity of 50%. Porosity was measured by measurement of the weight of the dry anode and compared with weight of a wet anode impregnated by a liquid (e.g. by isopropanol). The electrode was soaked in 30% KOH for 2 hours. The anode was placed into a cell between two bifunctional (secondary) air cathodes manufactured according to U.S. Pat. No. 8,142,938 B2. Into each gap between cathode and anode, two layers of Freudenberg separator grad2225 were placed and between those separators two layers of a cellulose separator were placed. KOH electrolyte (30%) was added to cover the electrodes. The cell was cycled at 0.5 A charge and 1.2 A discharge (charge to 2.4V, discharge to 0.75V) with makeup water added periodically. The cell delivered 5 Ah (64% depth of discharge) at 1.1 V average discharge voltage for 35 cycles. At that point the capacity had fallen to 4.5 Ah.

Following cycling the anode was examined using an optical microscope. The robust structure with immobilized zinc active material had been largely maintained with little evidence of shape change or dendrites.

Example 2

Anode for Comparative Test

The anode for comparative test was manufactured from the active mass according to Example 1 just excluding Al(OH)$_3$. The pressing procedure was the same. Instead of the sintering operation, a 20 minutes heating step at 100° C. for decomposition of ammonium bicarbonate was carried out. Mechanically the electrode was less strong than the electrode described in Example 1, but it was robust enough to be placed into the cell. The cell was cycled under the same conditions as in Example 1 and delivered 4.5 Ah at 1.0 V average discharge voltage for 20 cycles. At this point capacity had fallen to 2.5 Ah.

Optical microscope examination of the anode after cycling showed its comprehensive structural destruction and settling of zinc by gravitation force.

What is claimed is:

1. A rechargeable zinc electrode, said electrode comprising a current collector and a sintered composition comprising:
   a. a zinc or zinc alloy powder; and
   b. a thermoplastic organic binder material;
   wherein said electrode comprises a fibrous cage-like polymer structure which mechanically reinforces said composition during charge/discharge operation, and said polymer structure comprises Al$_2$O$_3$ stabilizing agent; and
   wherein said electrode is porous, and the porosity of said electrode is at least 20%.

2. The electrode of claim 1, wherein the porosity of said electrode is at least 35%.

3. The rechargeable zinc electrode of claim 1, wherein said composition comprises:
   a) between 1.0-99.0 wt % zinc or zinc alloy powder;
   b) between 0.1-10 wt % thermoplastic organic binder material; and
   c) between 0.01-10 wt % gelling agent;
   wherein said wt % is with respect to the total weight of said composition.

4. The electrode of claim 3, wherein said composition further comprises between 0.1-20 wt % Al$_2$O$_3$ stabilizing agent.

5. A rechargeable battery comprising at least one anode comprising the electrode of claim 1 and at least one cathode.

6. The battery of claim 5, wherein the porosity of said anode is at least 35%.

7. The rechargeable battery of claim 5, wherein the sintered composition of said electrode comprises:
   a) between 1.0-99.0 wt % zinc or zinc alloy powder;
   b) between 0.1-10 wt % thermoplastic organic binder material; and
   c) between 0.01-10 wt % gelling agent;
   wherein said wt % is with respect to the total weight of said composition.

8. The battery of claim 7, wherein said composition further comprises between 0.1-20 wt % Al$_2$O$_3$ stabilizing agent, wherein said wt % is with respect to the total weight of said composition.

9. A composition for the preparation of the rechargeable zinc electrode of claim 1, said composition comprising:
   a) a zinc powder or zinc alloy powder;
   b) a thermoplastic organic binder material; and
   c) aluminum hydroxide precursor of a stabilizing agent.

10. The composition of claim 9, wherein said composition comprises:
    a) between 1.0-99.0 wt % zinc powder or zinc alloy powder;
    b) optionally between 99.0-1.0 wt % zinc oxide powder;
    c) between 0.1-10 wt % thermoplastic organic binder material;
    d) between 0.01-20 wt % pore former material; and
    e) between 0.01-10 wt % gelling agent
    wherein said wt % is with respect to said composition.

11. The composition of claim 10, wherein said composition further comprises between 0.1-20 wt % of said aluminum hydroxide precursor.

12. The composition of claim 9, wherein said organic binder material comprises polytetrafluoroethylene (PTFE), fluorinated ethylenepropylene (FEP), perfluoroalkoxy (PFA), or a combination thereof.

13. The rechargeable zinc electrode of claim 1, wherein the composition further comprising zinc oxide or zinc oxide alloyed powder.

14. The rechargeable zinc electrode of claim 1, wherein the composition further comprises gelling agent.

15. The rechargeable zinc electrode of claim 3, wherein the composition further comprises between 99.0-1.0 wt % zinc oxide or zinc oxide alloyed powder.

16. The rechargeable battery of claim 7, wherein the sintered composition of said electrode further comprises between 99.0-1.0 wt % zinc oxide or zinc oxide alloyed powder.

17. The composition of claim 9, further comprising a zinc oxide or a zinc oxide alloyed powder.

18. The composition of claim 9, further comprising a pore former material.

19. The composition of claim 9, further comprising a gelling agent.

* * * * *